United States Patent [19]

Williamson

[11] 4,282,393

[45] Aug. 4, 1981

[54] ELECTRODE MELTING-Z TYPE ELECTRODE FIRING WITH CONTINUOUS ZONES

[75] Inventor: Michael Williamson, Newark, Ohio

[73] Assignee: Owens-Corning Fiberglas Corporation, Toledo, Ohio

[21] Appl. No.: 954,493

[22] Filed: Oct. 25, 1978

[51] Int. Cl.³ .............................................. C03B 5/02

[52] U.S. Cl. .............................................................. 13/6

[58] Field of Search .................................. 13/6, 23, 24

[56] References Cited

U.S. PATENT DOCUMENTS

| | | | |
|---|---|---|---|
| 3,836,689 | 9/1974 | Holler et al. | 13/6 |
| 3,967,046 | 6/1976 | Froberg et al. | 13/6 |
| 4,025,713 | 5/1977 | Suesser et al. | 13/6 |

*Primary Examiner*—Roy N. Envall, Jr.
*Attorney, Agent, or Firm*—Ronald C. Hudgens; Charles F. Schroeder; Joel I. Rosenblatt

[57] ABSTRACT

A furnace contains a plurality of zones. Each zone has at least one electrode adjacent a separate electrode of an adjoining zone. The adjacent electrodes are connected to separate power supplies, specifically separate windings of a transformer. In this manner, zones can be arranged immediately adjacent each other while minimizing current paths between non-associated electrodes to substantially zero. It is therefore, unnecessary to otherwise widely space firing zones within a furnace, and the spacing within the furnace may be filled with closer adjacent firing zones.

17 Claims, 3 Drawing Figures

ELECTRODE MELTING-Z TYPE ELECTRODE FIRING WITH CONTINUOUS ZONES

BACKGROUND OF THE PRIOR ART

In melting furnaces, especially glass melting furnaces, electrodes are arranged in groups, within separate zones, with each group of opposed electrodes connected across individual outputs of a power supply. The electrode groups may be two opposed electrodes or three electrodes in a group or other variations. In the prior art, set forth in U.S. Pat. No. 3,440,321, a Scott T connection is used to energize two groups of opposed electrodes within a furnace. Also shown in that same patent are two zones of two groups each, with each of the adjacent groups connected to the Scott T connection.

A problem with the prior art is that adjacent electrode groups such as the groups of electrodes shown in U.S. Pat. No. 3,440,321 must be widely physically separated to prevent crossfiring and undesired current paths between the electrodes of different groups. It has therefore been a problem to increase the number of heat producing zones within a furnace and the amount of heat which can be placed in an electric furnace has been limited.

SUMMARY OF THE INVENTION

In this invention, groups of opposed electrodes are arranged in zones of a furnace. The zones are arranged closer to each other than was possible before and are substantially adjacent with at least one electrode group of one zone adjacent an electrode group of an adjacent zone. Additionally, adjacent electrodes are connected to the same phase of a power supply.

The electrodes may be connected through a Scott T, two phase transformer or to a three phased transformer and it is now possible to substantially limit the current to the desired current paths between opposed electrodes. The furnace may be used to melt glass or any other material heated by the joule effect. By arranging the electrodes and the power connections to the electrodes according to the principles of this invention, it is now possible to increase the number of firing zones within a given furnace area, as compared to the prior art. With the technique disclosed, the spacing between adjacent electrode groups of two separate and different firing zones may be decreased to a minimal practical spacing. This spacing would then be limited by the practical considerations of the maximum current flux density and heat buildup that can be tolerated by an electrode. For example, the center to center spacing between adjacent electrodes may be on the order of five to six electrode diameters. Where three inch electrodes are arranged in a group, then the center to center spacing of the closest or adjacent electrodes of each group may be on the order of fifteen to eighteen inches.

The spacing between opposed electrodes arranged to define a firing path is considerably longer and is maximized to take advantage of a maximally long current path. For comparison purposes, this spacing may be on the order of 10 feet or longer.

With the arrangement disclosed, the vector sum of all sources in the undesirable firing paths between adjacent electrode groups and the relative resistance values within undesirable firing paths between adjacent electrode groups limit the current within the undesirable current paths between adjacent electrode groups to substantially zero.

DESCRIPTION OF THE DRAWINGS

Referring now to FIG. 1, a furnace is arranged as shown in the top view with the electrode groups designated as A1-B1 and A4-B4 in zone 1, electrode groups B5-C5 and B2-C2 in zone 2, and electrode groups C3-A3 and C6-A6 in zone 3.

Figure 1:
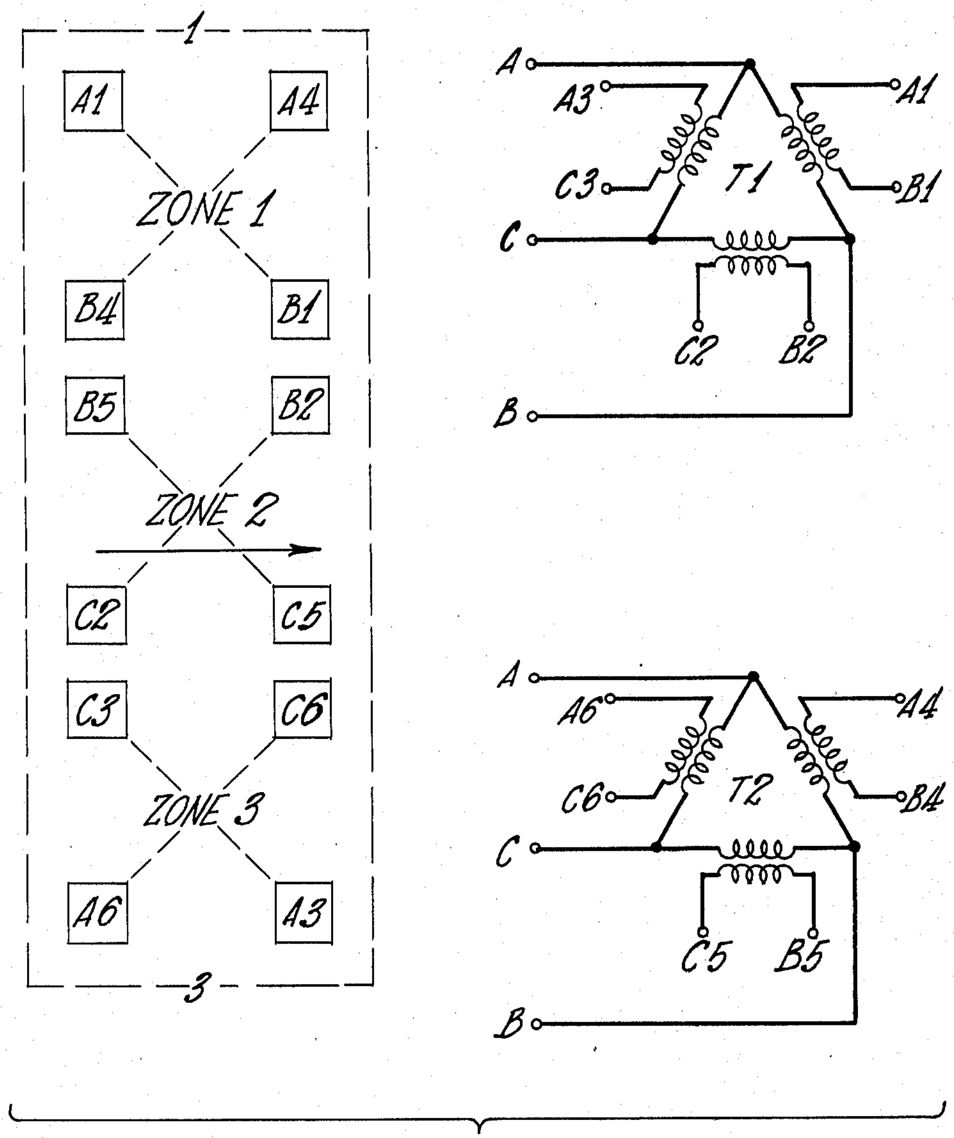
FIG. 1 shows the arrangement of the furnace zones and the electrodes with a three phased power supply.
Figure 2:
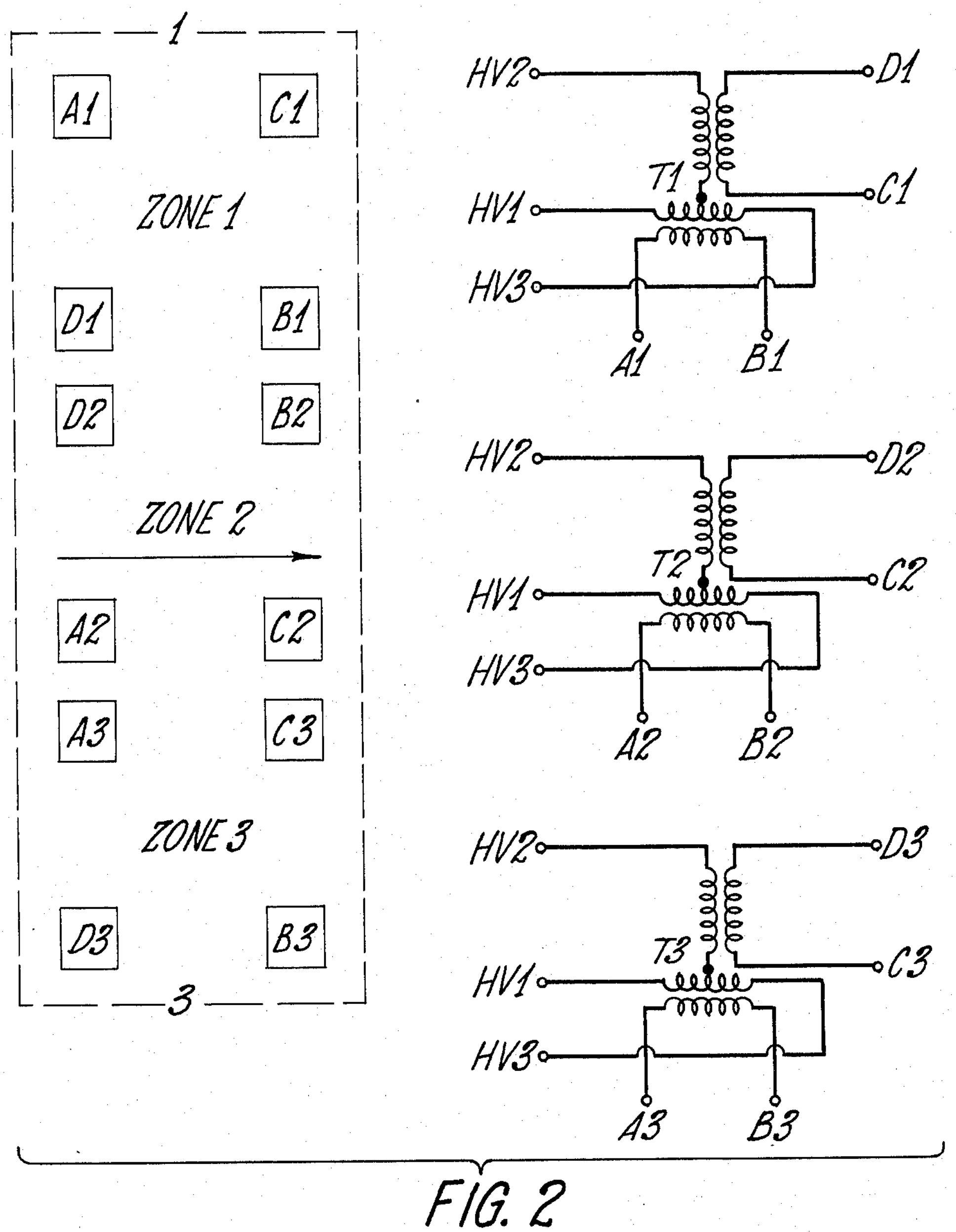
FIG. 2 shows the arrangement of the furnace zones and electrodes with a two phased power supply.
Figure 3:
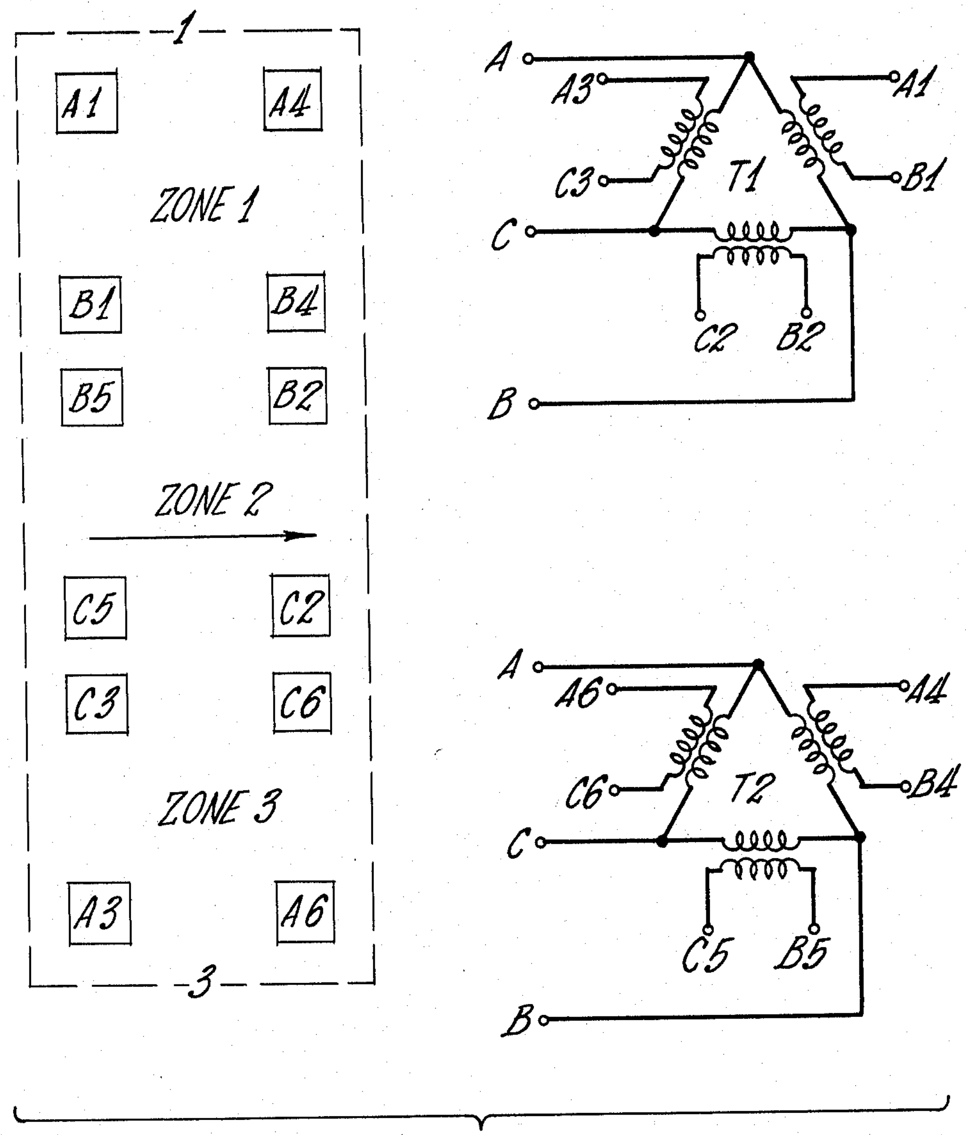
FIG. 3 is a variation of the three-phased arrangement of FIG. 1. The current paths within the furnace, and between electrode groups are described now with reference to the drawings but are not to be thought of as limited by the particular embodiments described.

The electrode groups of FIGS. 1, 2 and 3 may each have only two electrodes or a plurality of electrodes. For example, A1 may comprise a plurality of electrodes, such as four electrodes arranged in a rectangle or square or any other suitable arrangement.

Although it is not important to the scope of the invention, the flow of the melting furnace is shown by the direction of the arrow. The transformers for energizing the electrodes shown also in FIG. 1 are transformers T1 and T2. Transformers T1 and T2 are both connected to a three phase supply consisting of terminals A, B, and C. On the output side of the transformers the output terminals, A1, B1, C2, B2, A3, C3, A4, B4, B5, C5, A6 and C6 are connected to the electrode groups, as shown by the corresponding electrode designations.

For example, terminals, A1 and B1 of transformer T1 are connected to electrode group A1-B1 and the current path from A1 to B1 passes through zone 1. Similarly, terminals A3 and C3 of transformer T1 are connected to electrode A3-C3.

Within the three-phase system shown in FIG. 1 the undesirable currents are substantially zero.

The desired firing paths are for

Zone 1: A1-B1, A4-B4

Zone 2: B5-C5, B2-C2

Zone 3: C3-A3, A6-C6

The furnace is substantially filled with current paths from the outer end limit of zone 1 at 1 to the outer limit of zone 3 at 3. There exists a minimal of empty spaces or voids between firing zones.

The voids or empty spaces are those spaces between the adjacent electrode groups, such as the space between B4 and B5, B1 and B2, C2 and C3, and C5 and C6. Such spacing, defining the undesirable current paths, may be minimized, subject to the practical considerations of maximum tolerable current density at the electrode and heat buildup. For example, the center to center spacing between adjacent electrodes may be on the order of 5 to 6 electrode diameters. This spacing should not be thought of limiting of the principles of this invention but is illustrative of the practical considerations in furnace design and electrode placement. This same consideration must also be applied to the spacing of electrodes within an electrode group connected in parallel to a common source. For example, where B4 contains four electrodes arranged in a rectangle and connected in common to a single source of power, the inter-electrode spacing would be limiting as described above, due to the same practical considerations of heat buildup.

The vector sum of all sources in undesirable firing current paths and the relative resistance values within undesirable firing paths limits the undesirable currents to substantially zero relative to the desirable currents.

The connections to the electrodes are such that the current flow between adjacent electrodes is substantially zero. Adjacent electrodes in this regard are B4 and B5; B1 and B2; C2 and C3; C5 and C6.

In FIG. 2 a two phase power supply arrangement for the electrodes is shown, where the electrical connection is in the form of a Scott T and with the electrode connections to the transformer terminals as indicated.

The desired firing paths for FIG. 2 are A1-B1 and D1-C1 in zone 1, D2-C2 and A2-B2 in zone 2, A3-B3, and C3-D3 in zone 3.

As shown within FIG. 2, each of the zones is immediately adjacent another zone so that zone 1 is adjacent to zone 2, and zone 2 is adjacent to zone 3, and the zones along the length of the furnace from end 1 to end 3 are separated by voids subject to the practical considerations discussed above with reference to FIG. 1.

The flow of material in the furnace is in the direction of the arrow, although it is not necessary to the practice of this invention to flow the material out of the furnace as shown in the direction of the arrow.

As in the case of FIG. 1 substantially no current flows between zones.

As alternate arrangement to FIG. 1 is that shown in FIG. 3, where it is to be understood that the transformers as shown in FIG. 1 are employed in FIG. 3 but with the connections that are shown in FIG. 3 as marked on the electrode groups. For example, in zone 1, the output of transformer T1, terminals A1 and B1 are connected to respective electrodes A1 and B1. Similarly, transformer terminals A3 and C3 are connected to respective electrodes A3 and C3 in zone 3, and transformer terminals C2 and B2 are connected to respective electrodes C2 and B2 in zone 2.

The output of transformer 2, terminals A4 and B4 are connected to respective electrodes A4 and B4 in zone 1, output terminals B5 and C5 are connected to respective electrodes B5 and C5 in zone 2, and output terminals A6 and C6 are connected to respective electrodes A6 and C6.

The desired firing paths are A1-B1 and A4-B4 in zone 1, B5-C5 and B2-C2 in zone 2, and C3-A3 and C6-A6 in zone 3. As in the case of FIG. 1, the vector sum of all sources in the undesirable current paths and the resistances across the undesirable current paths reduce the currents in the undesirable current paths to substantially zero relative to the desired currents.

As shown, the zones 1, 2 and 3 are each immediately adjacent to at least one other zone. Zone 1 is adjacent to zone 2 and zone 2 is adjacent to zone 3, such that electrode firing paths are spread across the length of the furnace from end 1 to end 3 with a minimal void between zones subject to the same practical considerations as discussed with regards to FIG. 1. As in the case of the embodiments in FIGS. 1 and 2, the flow of material is shown in the direction of the arrow, although not necessarily so for the practice of this invention.

The purpose of this invention is to increase the length of firing paths, while at the same time minimizing areas within the furnace which are void of electrodes and firing paths.

By increasing the firing paths between electrodes, as shown especially in FIGS. 1 and 2 where the firing paths are diagonally across the firing zones, the resistance between the electrodes is increased, and power per zone per unit current is increased.

A line drawn through the firing paths for three zones shown in FIGS. 1 and 2 resembles a Z (as shown by the dashed lines from A1 to B1, B2 to C2, and C3 to A3 describing the letter "Z", and from A4 to B4, B5 to C5 and C6 to A6 also describing the letter "Z".) Accordingly, lines drawn through the firing paths of the electrodes in FIGS. 1 and 2 in each of the zones would resemble an X. A line drawn from electrode A1 to B1 and electrode B4 to A4 of zone 1 in FIG. 1 would resemble an X, as would lines drawn across the current paths in zones 2 and 3 in FIGS. 1 and 2.

Similarly, a line drawn between the current paths of one electrode group of each of two adjacent zones would resemble a V. A line drawn from electrodes A1 to B1 and a line drawn from electrode B2 to C2 would resemble a V for the two contiguous zones, zone 1 and zone 2.

The transformers are connected to the adjacent electrodes of adjacent zones so that the same phase is applied to adjacent electrodes and different phases are applied to the corresponding respective opposed electrodes for each of the adjacent electrodes. As shown, phase AB is connected across electrode group A1 B1 of zone 1, while phase BC is connected across electrode group B2 C2 of zone 2. The adjacent electrodes B2 and B1 are connected to the same phase polarity while the electrodes A1 and C2 are connected to phases A and C, respectively. This pattern is continued for the firing paths B2-C2 and A3-C3; A4-B4 and B5-C5; and B5-C5 and C6-A6 of FIG. 1.

As shown in FIG. 3, the firing paths are on each side of the furnace and the separate firing paths do not cross. With this arrangement, and with the phasing shown, the furnace floor or bottom wall from end 1 to end 3 can be substantially filled with firing zones so that a firing path is established in each zone and each zone is to another zone, separated by a minimal void between adjacent electrodes.

I claim:

1. A furnace for heating a thermoplastic material, said furnace comprising: a container for said thermoplastic material; a first group of electrodes located in said container and having a first and second electrode; a second group of electrodes located in said container and having a first and second electrode, said first electrode of said first group being located adjacent said first electrode of said second group; a first power supply connected to said first and second electrodes of said first group; and a second power supply connected to said first and second electrodes of second group, said first and second power supplies being electrically connected to each other only through said thermoplastic material and having a phase shift therebetween so that the current paths within said thermoplastic material are substantially limited to flow between said first and second electrodes of each respective group.

2. A furnace as recited in claim 1, wherein said first power supply comprises a coil associated with the first and second legs of a means for supplying three phase electrical power, and said second power supply comprises a coil associated with the second and third legs of said means for supplying three phase electrical power.

3. A furnace as recited in claim 2, further comprising a third group of electrodes having a first and second electrode and being positioned in said container such that said first and third group form a first zone in said furnace; a fourth group of electrodes having a first and second electrode, and being positioned in said container such that said second and fourth groups form a second zone in said furnace with said first electrode of said third group being located adjacent said first electrode of said fourth group; a third power supply connected to said first and second electrodes of said third group, said third power supply comprising a coil associated with the first and second legs of a second means for supplying three phase electrical power; a fourth power supply connected to said first and second electrodes of said fourth group, said fourth power supply comprising a coil associated with the second and third legs of said second means for supplying three phase electrical power, said first, second and third legs of said second means for supplying three phase electrical power having the same phase relationship as said first, second and third legs of said means for supplying three phase electrical power, and said third and fourth power supplies being connected to each other only through said thermoplastic material and having a phase shift therebetween so that there is substantially no current flow between adjacent electrodes of said first and second zones.

4. A furnace as recited in claim 3, further comprising a fifth group of electrodes having a first and second electrode and being positioned in said furnace such that said second electrode of said fifth group is adjacent said second electrode of said second group; a sixth group of electrodes having a first and second electrode and being positioned in said furnace such that said second electrode of said sixth group is adjacent said second electrode of said fourth group, said fifth and sixth groups being positioned in said furnace such that they form a third zone; a fifth power supply connected to said first and second electrodes of said fifth group, said fifth power supply comprising a coil associated with said first and third legs of said means for supplying three phase electrical power; and a sixth power supply connected to said first and second electrodes of said sixth group, said sixth power supply comprising a coil associated with said third and first legs of said second means for supplying three phase electrical power.

5. A furnace as recited in claim 4, wherein the distances between the first and second electrodes of the respective groups of electrodes in each respective zone are in the form of an X.

6. A furnace as recited in claim 5, wherein the distances between said first group of electrodes in said first zone, said second group of electrodes in said second zone, and said fifth group of electrodes in said third zone are in the form of a Z.

7. A furnace as recited in claim 6, wherein said means for supplying three phase electrical power and said second means for supplying three phase electrical power each comprise a three phase transformer having three unconnected secondary coils.

8. A furnace as recited in claim 1, wherein the respective distances between said first and second electrodes of said first group and said first and second electrodes of said second group are long in comparison to the distance between said first electrode of said first group and said first electrode of said second group.

9. A furnace as recited in claim 1, wherein said first and second electrodes of said first group and said first and second electrodes of said second group each comprise a plurality of electrodes.

10. A furnace as recited in claim 3, wherein said first group of electrodes of said first zone and said second group of electrodes of said second zone lie substantially in a straight line.

11. A furnace for heating a thermoplastic material, said furnace comprising: a container for said thermoplastic material; a first, second, third, and fourth group of electrodes, each group being located in said container and having a first and second electrode, with said first and second groups being positioned such that they form a first zone in said furnace and said third and fourth groups being positioned in said furnace such that they form a second zone in said furnace and said first electrode of said first group is located adjacent said first electrode of said third group and said first electrode of said second group is located adjacent said first electrode of said fourth group; a first, second, third, and fourth power supply respectively connected to said first and second electrodes of said first, second, third, and fourth groups of electrodes, each of said first and second power supplies comprises a coil associated with a means for providing multi-phase electrical power, and each of said third and fourth power supplies comprises a coil associated with a second means for providing multi-phase electrical power with said first and second power supplies and said third and fourth power supplies being in phase quadrature, and the power supplied to said first electrodes of said first and third groups has the same phase relationship and the power supplied to said first electrodes of said second and fourth groups has the same phase relationship.

12. A furnace as recited in claim 11, further comprising a fifth and sixth group of electrodes with each group having a first and second electrode, said fifth and sixth groups being positioned in said container such that they form a third zone, said second electrode of said fifth group being located adjacent said second electrode of said third group and said second electrode of said sixth group being adjacent said second electrode of said fourth group; fifth and sixth power supplies respectively connected to said first and second electrodes of said fifth and sixth group, said fifth and sixth power supplies each comprising a coil associated with a third means for providing multi-phase electrical power, and said fifth and sixth power supply being in phase quadrature, and the power supplied to said second electrodes of said third and fifth groups has the same phase relationship and the power supplied to said second electrodes of said fourth and sixth groups has the same phase relationship.

13. A furnace as recited in claim 10, wherein said first and second means for providing multi phase electrical power comprise transformers connected in a Scott configuration.

14. A furnace as recited in claim 12, wherein the distances between the first and second electrodes of the respective groups of electrodes in each respective zone are in the form of an X.

15. A furnace as recited in claim 14, wherein the distances between said first group of electrodes in said first zone, said third group of electrodes in said second zone, and said fifth group of electrodes in said third zone are in the form of a Z.

16. A furnace as recited in claim 10, wherein the respective distances between said first and second electrodes of said first group and said first and second electrodes of said third group are long in comparison to the distance between said first electrode of said first group and said first electrode of said third group.

17. A furnace as recited in claim 11, wherein said first and second electrodes of said first, second, third and fourth groups each comprise a plurality of electrodes.

* * * * *

UNITED STATES PATENT AND TRADEMARK OFFICE

CERTIFICATE OF CORRECTION

PATENT NO. : 4,282,393

DATED : August 4, 1981

INVENTOR(S) : Michael Williamson

It is certified that error appears in the above—identified patent and that said Letters Patent is hereby corrected as shown below:

Column 1, line 38, "phase" should read -- phased --.

Column 2, line 38, "group" should be inserted after "electrode"

Column 2, line 66, "limiting" should read -- limited --.

Column 3, line 28, "As" should read -- An --.

Column 6, line 47, "10" should read -- 11 --.

Column 6, line 59, "10" should read -- 11 --.

Signed and Sealed this

*Thirteenth* Day of *October 1981*

[SEAL]

*Attest:*

GERALD J. MOSSINGHOFF

*Attesting Officer* *Commissioner of Patents and Trademarks*